US008861918B2

(12) United States Patent
Vazquez et al.

(10) Patent No.: US 8,861,918 B2
(45) Date of Patent: Oct. 14, 2014

(54) FIBER OPTIC ADAPTER MODULE AND TRAY

(75) Inventors: Mariano Perez Vazquez, Reynosa (MX); Juan Miguel Gonzalez, Reynosa (MX); Fernando M Esparza, Reynosa (MX); Cesar E. Valdez, Reynosa (MX); Robert W. Dennis, Hickory, NC (US); Alan W. Ugolini, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 647 days.

(21) Appl. No.: 12/221,117

(22) Filed: Jul. 31, 2008

(65) Prior Publication Data

US 2009/0067800 A1  Mar. 12, 2009

Related U.S. Application Data

(60) Provisional application No. 60/967,798, filed on Sep. 7, 2007.

(51) Int. Cl.
*G02B 6/00* (2006.01)
*G02B 6/44* (2006.01)
*H04Q 1/14* (2006.01)
*H04Q 1/02* (2006.01)
*H04Q 1/06* (2006.01)

(52) U.S. Cl.
CPC .............. *G02B 6/4455* (2013.01); *H04Q 1/142* (2013.01); *H04Q 1/021* (2013.01); *H04Q 1/066* (2013.01); *G02B 6/4452* (2013.01); *G02B 6/4453* (2013.01)
USPC ........................................................ 385/135

(58) Field of Classification Search
USPC ....................................................... 385/135
See application file for complete search history.

(56) References Cited

U.S. PATENT DOCUMENTS

| 6,208,796 | B1 * | 3/2001 | Williams Vigliaturo | 385/135 |
|---|---|---|---|---|
| D448,005 | S * | 9/2001 | Klein et al. | D13/123 |
| 6,866,541 | B2 * | 3/2005 | Barker et al. | 439/540.1 |
| 7,070,459 | B2 * | 7/2006 | Denovich et al. | 439/719 |
| 7,300,308 | B2 * | 11/2007 | Laursen et al. | 439/540.1 |
| 7,493,002 | B2 * | 2/2009 | Coburn et al. | 385/135 |
| 2005/0233647 | A1 | 10/2005 | Denovich et al. | 439/719 |
| 2006/0018622 | A1 | 1/2006 | Caveney et al. | 385/135 |
| 2006/0275009 | A1 * | 12/2006 | Ellison et al. | 385/135 |
| 2007/0196071 | A1 | 8/2007 | Laursen et al. | 385/135 |

OTHER PUBLICATIONS

Patent Cooperation Treaty, International Search Report for International Application No. PCT/US2008/010317, Dec. 4, 2008, 1 page.

* cited by examiner

*Primary Examiner* — Charlie Peng

(57) ABSTRACT

A fiber optic adapter module and tray. The fiber optic adapter module supports fiber optic adapters for fiber optic connections. The fiber optic adapter module may be included on an extendible tray portion of a fiber optic equipment tray and selectively configured to be tilted when extended for providing enhanced access to the fiber optic adapter module. In one embodiment, an adapter module panel of the fiber optic adapter module that supports fiber optic adapters contains at least two forward facing panel surfaces angled to one another to provide more surface area for supporting a higher density of fiber optic adapters and/or for neat routing and organizing of fiber optic connections. One or more fourth flared panel surfaces may also be included on an end(s) of the adapter module panel to provide sufficient interior space for fiber optic connections adjacent or proximate to sides of the fiber optic equipment tray.

17 Claims, 18 Drawing Sheets

FIBER OPTIC ADAPTER MODULE AND TRAY

RELATED APPLICATION

The present application claims priority to U.S. Provisional Patent Application Ser. No. 60/967,798, filed on Sep. 7, 2007 and entitled "FIBER OPTIC ADAPTOR TRAY," which is incorporated herein by reference in its entirety.

BACKGROUND OF THE INVENTION

1. Field of the Invention

The present invention is related to a fiber optic adapter module and fiber optic equipment tray configured to support the fiber optic adapter module. The fiber optic adapter module and fiber optic equipment tray are configured to provide high density fiber optic connections and/or enhanced convenience to technicians in accessing fiber optic adapters for fiber optic cable connections.

2. Technical Background

Benefits of optical fiber use include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points at which it is necessary to link optical fibers in order to provide "live fiber" from one connection point to another connection point. In this regard, fiber optic equipment is located in data distribution centers or central offices to support interconnections. The fiber optic equipment is customized based on the application need. The fiber optic equipment is typically included in housings that are mounted in equipment racks to maximize space.

One example of fiber optic equipment provided at data distributor centers or central offices is a fiber optic adapter module. A fiber optic adapter module is designed to provide cable-to-cable fiber optic connections and manage the polarity of fiber optic cable connections. The fiber optic adapter module is typically mounted to a chassis which is then mounted inside an equipment rack. The chassis may be provided in the form of a tray that is extendable from the equipment rack like a drawer to allow technicians access to fiber optic adapters provided by the fiber optic adapter module and any fiber optic cables connected to the fiber optic adapters without removing the fiber optic adapter module from the equipment rack. Due to increasing bandwidth needs and the need to provide high connectivity density in data centers, fiber optic networks are migrating to higher cabled fiber counts using multi-fiber cables. Multi-fiber cables are typically provided in the form of optical ribbon cables. Multi-fiber cables are often used for trunk connections in a fiber optic network. In this regard, fiber optic adapter modules are being designed to support multi-fiber cables to condense individual optical fibers into multi-fiber cables and to manage polarity of same.

Due to these higher connectivity density designs, fiber management is often complex and difficult due to the number of optical connections. The same is true for fiber optic adapter modules, which are requiring an increased number of fiber optic adapters to handle higher density designs. Higher density connections make it more difficult to access optical components and connections. Fiber optic equipment trays are designed to be pulled out to allow technicians easier access for making optical fiber interconnections. However, increased density makes hand access by technicians to optical components and connectors as well as the routing and organizing jumper connections more difficult. Even with fiber optic equipment tray pull out capabilities, a need still exists to improve access to optical components in a fiber optic equipment tray as well as provide neat routing and organization of jumper connections.

SUMMARY OF THE DETAILED DESCRIPTION

Embodiments disclosed in the detailed description include a fiber optic adapter module for supporting high density fiber optic connections. The fiber optic adapter module includes an adapter module panel supporting a plurality of fiber optic adapters that provides enhanced convenient access and neat routing and organizing of high density fiber optic connections. In one embodiment, the adapter module panel contains at least two forward facing panel surfaces angled to one another. Angled panel surfaces provide more surface area on the adapter module panel for supporting high density fiber optic adapters and increasing hand access space to the fiber optic adapters. A third and/or fourth flared panel surface may also be included on or proximate to ends of the adapter module panel and intersecting with the angled panel modules. Providing flared panel surfaces allows room for additional fiber optic adapters to be supported on or proximate to the ends of the adapter module panel for receiving optical connectors and also avoiding or reducing tight bending in fiber optic cables.

The fiber optic adapter module may also be provided in a fiber optic equipment tray that can be mounted in an equipment rack. To provide enhanced access to the fiber optic adapter module and to the fiber optic adapters supported therein, the fiber optic equipment tray contains an extendible tray. The fiber optic adapter module is coupled to the extendible tray. The extendible tray is coupled to a fixed portion of the fiber optic equipment tray and selectively extendible from an interior position within the fixed portion to a position generally external to the fixed portion. This allows the fiber optic adapter module to be extended out from an equipment rack to allow access to the fiber optic adapters and optical connections supported by the fiber optic adapter module. The extendible tray may also include a pivot mechanism configured to selectively tilt the extendible tray at a tilt angle relative to the fixed portion to provide enhanced access. This may be especially beneficial when a fiber optic equipment tray supporting a fiber optic adapter module is located in an equipment rack above technician arm height. The titling ability of the fiber optic equipment tray lowers the height of the fiber optic adapters and lowers arm height required to have a more direct line of access to the fiber optic adapters for making fiber optic connections.

Any type of optical fiber wiring scheme may be employed within the fiber optic adapter module. For example, a conventional networking solution employing a pair-wise fiber flip routing scheme that may be employed in the fiber optic adapter module. Alternatively, a universal optical fiber routing scheme may be employed whereby at least one of the optical fiber pairs routed by the fiber optic adapter module are are immediately adjacent in the fiber optic cable carrying the optical fibers. Using this networking module arrangement, multiple spans of assemblies can be interconnected. Fiber flips in the trunk assembly just prior to one end of a multi-fiber connector for polarity correction are not necessary, resulting in a complexity and/or cost reduction.

Additional features and advantages of the invention will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operation of the invention.

DETAILED DESCRIPTION OF THE PREFERRED EMBODIMENTS

Reference will now be made in detail to the preferred embodiments of the present invention, examples of which are illustrated in the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in this detailed description include a fiber optic adapter module for supporting high density fiber optic connections. The fiber optic adapter module includes an adapter module panel supporting a plurality of fiber optic adapters that provides enhanced convenient access and neat routing and organizing of high density fiber optic connections. In one embodiment, the adapter module panel contains at least two forward facing panel surfaces angled to one another. Angled panel surfaces provide more surface area on the adapter module panel for supporting high density fiber optic adapters and increasing hand access space to the fiber optic adapters. A third and/or fourth flared panel surface may also be included on or proximate to ends of the adapter module panel and intersecting with the angled panel modules. Providing flared panel surfaces allows room for additional fiber optic adapters to be supported on or proximate to the ends of the adapter module panel for receiving optical connectors and also avoiding or reducing tight bending in fiber optic cables.

Figure 1:
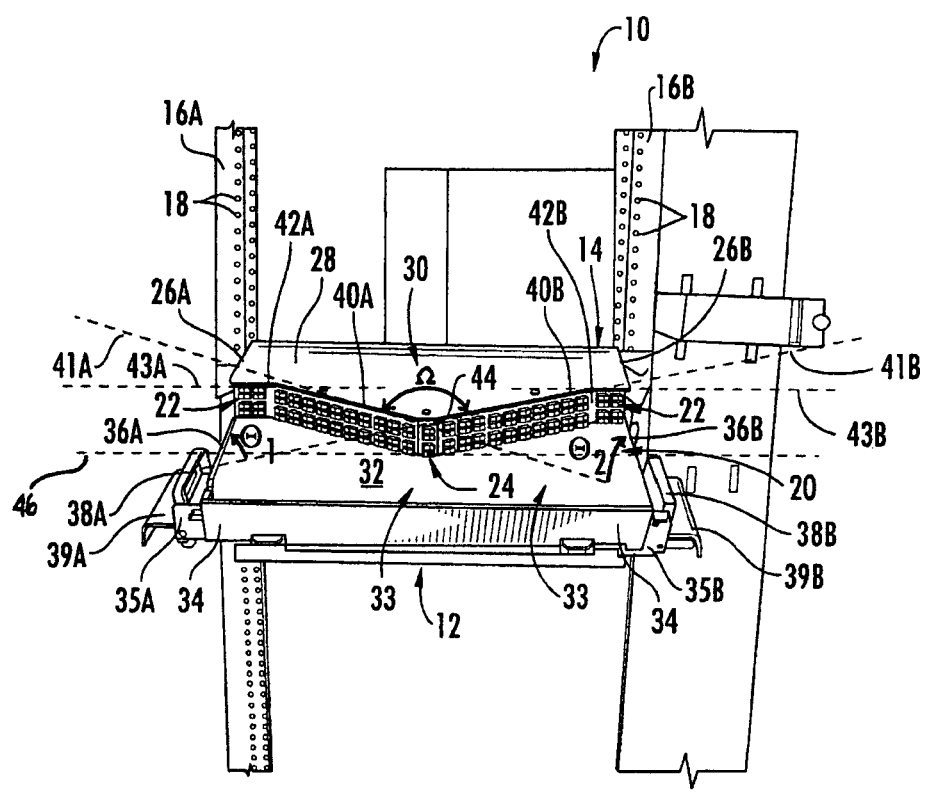
FIG. 1 is a front perspective view of an exemplary fiber optic equipment tray supporting an exemplary fiber optic adapter module, according to an embodiment of the invention.

The fiber optic adapter module may also be provided in a fiber optic equipment tray that can be mounted in an equipment rack. To provide enhanced access to the fiber optic adapter module and to the fiber optic adapters supported therein, the fiber optic equipment tray contains an extendible tray. The fiber optic adapter module is coupled to the extendible tray. The extendible tray is coupled to a fixed portion of the fiber optic equipment tray and selectively extendible from an interior position within the fixed portion to a position generally external to the fixed portion. This allows the fiber optic adapter module to be extended out from an equipment rack to allow access to the fiber optic adapters and optical connections supported by the fiber optic adapter module. The extendible tray may also include a pivot mechanism configured to selectively tilt the extendible tray at a tilt angle relative to the fixed portion to provide enhanced access. This may be especially beneficial when a fiber optic equipment tray supporting a fiber optic adapter module is located in an equipment rack above technician arm height. The titling ability of the fiber optic equipment tray lowers the height of the fiber optic adapters and lowers arm height required to have a more direct line of access to the fiber optic adapters for making fiber optic connections FIG. 1 illustrates a front perspective view of an exemplary fiber optic equipment tray supporting an exemplary fiber optic adapter module, according to an embodiment of the invention. As illustrated, an equipment rack 10 is provided that supports a fiber optic equipment tray 12. The fiber optic equipment tray 12 includes a fiber optic adapter module 14. The equipment rack 10 comprises two rails 16A, 16B that extend vertically and include a series of apertures 18 for facilitating attachment of equipment inside the equipment rack 10. Equipment is attached and supported to the equipment rack 10 typically in the form of shelves that are stacked on top of each other within the vertical rails 16A, 16B. As illustrated, the fiber optic equipment tray 12 is attached to the vertical rails 16A, 16B. The equipment rack 10 may support 1U sized shelves, with 'U' equaling a standard 1.75 inch height. As will be discussed in greater detail later in this application, the fiber optic equipment tray 12 includes an extendible tray 20 carrying the fiber optic adapter module 14 that is selectively extendible from the equipment rack 10 and tiltable downward from a fixed portion of the fiber optic equipment tray 12. The fixed portion of the fiber optic equipment tray 12 is designed to remain within the equipment rack 10 such that the extendible tray 20 and the fiber optic adapter module 14 carried therein can extend outside of the equipment rack 10 for convenient access to fiber optic adapters 22 provided in the fiber optic adapter module 14.

Figure 2A:
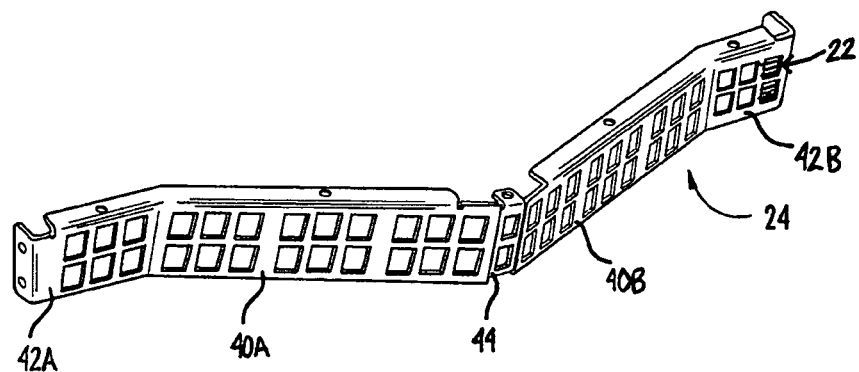
FIG. 2A illustrates a fiber optic connector cover plate for the fiber optic adapter module illustrated in FIG. 1.
Figure 2B:
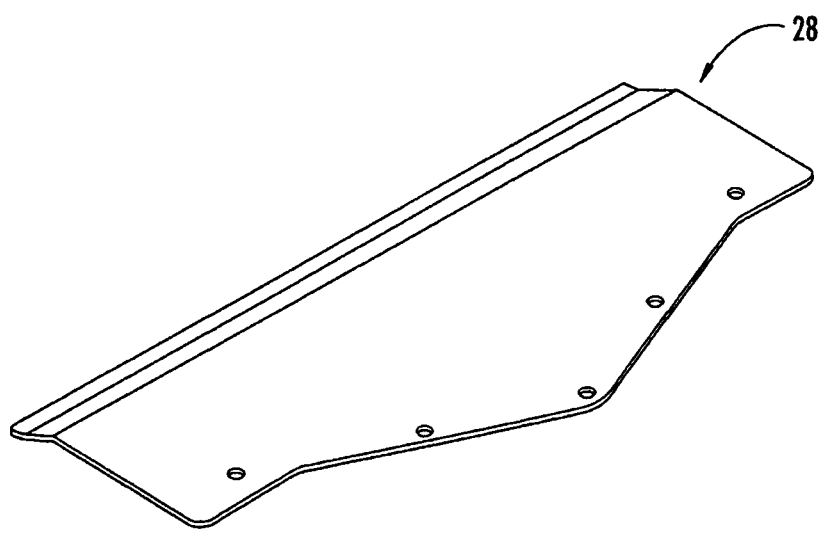
FIG. 2B illustrates the fiber optic adapter module housing cover for the fiber optic adapter module illustrated in FIG. 1.
Figure 3:
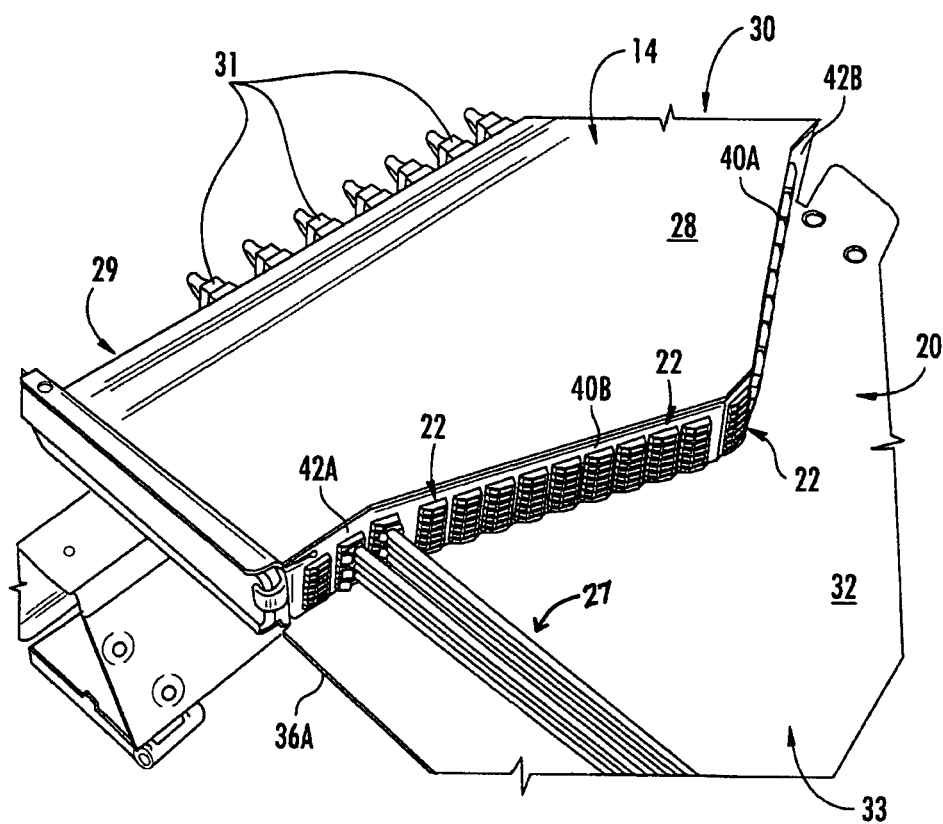
FIG. 3 illustrates exemplary connectorized fiber optic cables connected to fiber optic adapters in the fiber optic adapter module of FIG. 1.

The fiber optic adapter module 14 illustrated in FIG. 1 is designed such that connectorized fiber optic cables can be coupled to the series of fiber optic adapters 22 arranged in column and row format and supported by an adapter module panel 24 of the fiber optic adapter module 14. Using the fiber optic adapter module 14, interconnection of assemblies are deployable in a network, for example, a local area network (LAN) or storage area network (SAN). The adapter module panel 24 of FIG. 1 is illustrated in isolation in FIG. 2A. As shown, the fiber optic adapters 22 extend out orthogonally or substantially orthogonally to the plane of adapter module panel 24. Alternatively, the fiber optic adapters 22 may extend out non-orthogonally to the plane of the adapter module panel 24. The adapter module panel 24 extends across the front of the fiber optic adapter module 14 between an opposing first side 26A and second side 26B, wherein an adapter cover 28 (also illustrated in FIG. 2B) extends across the first and second sides 26A, 26B and the adapter module panel 24 to form an adapter module enclosure or housing 30. Optical components and connections, including one or more optical paths, may be provided inside the adapter module housing 30 and coupled to the fiber optic adapters 22 to support fiber optic connections, routing, and related functionalities and capabilities. A series of optical paths may be provided inside the adapter module housing 30 such that fiber optic connectors coupled to the fiber optic adapters 22 are routed to a specified fiber optic adapter extending out of a rear panel 29 (illustrated in FIG. 3) of the adapter module housing 30. For example, the fiber optic adapter module 14 of FIG. 1 is configured with forty eight (48) LC duplex fiber optic adapters 22 for supporting connections to ninety six (96) optical fibers. Optical paths coupled to the LC duplex fiber optic adapters 22 are provided inside the adapter module housing 30 and are routed to eight MTP connector adapters 31 extending through the rear panel 29 of the fiber optic adapter module 14 (illustrated in FIG. 3). The MTP connector adapters 31 are designed for multi-mode or single-mode applications, and can use a push/pull design for easy mating and removal. The MTP connector adaptors 31 can be the same size as a conventional SC, but provide twelve times the fiber density, advantageously saving costs and space. The MTP connector adapters 31 include a key for proper orientation for registration with any required optical adapters.

When optical fibers 27 are coupled to the fiber optic adapter 22 (see FIG. 3), they extend outward from the adapter module panel 24 across a floor 32 of the extendible tray 20 into an interior space 33 between the adapter module panel 24 and a front door 34. The front door 34 can be raised and lowered (via cam latches 35A, 35B that will be discussed in more detail later in this application) to protect and allow access to the fiber optic adapters 22 and any fiber optic cable coupled thereto. Such fiber optic cables may be routed to sides 36A, 36B of the extendible tray 20 so that the fiber optic cables are fanned to the sides of the front door 34. Cable retention members 38A, 38B may be positioned on the extendible tray sides 36A, 36B proximate the front door 34 to group and retain fiber optic cables extending inside the extendible tray 20 and coupled to the fiber optic adapters 22. Providing the cable retention members 38A, 38B proximate the front door 34 facilitates the fiber optic cables extending outside a forward part of the extendible tray 20 so the fiber optic cables do not obstruct retention of the extendible tray 20 inside the equipment rack 10. Curved or waterfall members 39A, 39B may also be located and attached to the extendible tray 20 at the extendible tray sides 36A, 36B proximate the cable retention members 38A, 38B and extending out from the sides 36A, 36B to further avoid or reduce tight bending of fiber optic cables as they extend out of the extendible tray 20. Each of the components of the equipment rack 10, fiber optic equipment tray 12, and the fiber optic adapter module 14 may be constructed of any material, including but not limited to metal, aluminum, hardened plastic, and the like. If metal or aluminum in particular, the components may be constructed of pre-fabricated sheets of the metal or aluminum.

The adapter module panel 24 illustrated in FIG. 1 is designed such that it contains two forward facing panel surfaces 40A, 40B such that their longitudinal axes 41A, 41B intersect at an angle ($\Omega$) to one another. The forward facing angled panel surfaces 40A, 40B (also referred to herein as "angled panel surfaces") provide more surface area on the adapter module panel 24 for supporting high density fiber optic adapters. The angle between the longitudinal axes 41A, 41B of the angled panel surfaces 40A, 40B and the extendible tray side walls 36A, 36B, $\Theta_1$ and $\Theta_2$, respectively, may be the same or different angle. The angle may be any acute angle between one (1) and eighty nine (89) degrees. In the illustrated example, the angles $\Theta_1$ and $\Theta_2$ are the same angle and are both approximately twenty five (25) degrees. By the panel surfaces 40A, 40B being angled to converge toward the front of the extendible tray 20 (referred to herein as a "convex" panel surface arrangement), they provide an increased amount of interior space 33 inside the extendible tray 20 proximate or adjacent the extendible tray sides 36A, 36B. This increased interior space 33 provides increased hand access space for technicians to access the fiber optic adapters 22, as opposed to a single adapter module panel surface extending straight across and perpendicular to the sides 36A, 36B. A concave angled panel surface arrangement, whereby the panel surfaces are angled to converge toward the rear of the extendible tray 20, is also contemplated as such an arrangement also provides more surface area on the adapter module panel 24 for supporting high density fiber optic adapters. However, a concave surface panel arrangement would tend to direct connected fiber optic cables to the center instead of the sides 36A, 36B of the extendible tray 20, thus making cable accesses and routing possibly more complex.

In the fiber optic adapter module 14 of FIG. 1, the adapter module panel 24 also includes optional third and fourth flared panel surfaces 42A, 42B. A flared surface as provided herein is a surface aligned along a longitudinal axis that intersects with the longitudinal axes 41A, 41B of an angled panel surface 40A, 40B. In this illustrated embodiment, the third and fourth flared panel surfaces are aligned along longitudinal axes 43A, 43B that intersect with the longitudinal axes 41A, 41B of the angled panel surfaces 40A, 40B. The third and fourth flared panel surfaces 42A, 42B are located on the ends of the adapter module panel 24 adjacent to the extendible tray sides 36A, 36B. The third and fourth flared panel surfaces 42A, 42B may or may not directly attach to the angled panel surfaces 40A, 40B. In this illustrated example, the length of the third and fourth flared panel surfaces 42A, 42B are each approximately 2.25 inches (in), while the length of the angled panel surfaces 40A, 40B are each approximately 5 inches (in) each.

The third and fourth flared panel surfaces 42A, 42B are configured such that their longitudinal axes 43A, 43B intersect the longitudinal axes 41A, 41B of the angled panel surfaces 40A, 40B. This allows room for fiber optic connections to be made to fiber optic adapters 22 located proximate or adjacent to the extendible tray sides 36A, 36B of the adapter module panel 24 while avoiding or reducing tight bending in fiber optic cables coupled to such fiber optic adapters 22. This is illustrated by example in FIG. 3. Since the fiber optic adapters 22 extend out orthogonally or substantially orthogonally to the plane of adapter module panel 24, if flared panel surfaces 42A, 42B are not provided, the fiber optic adapters 22 located in the adapter module panel 24 proximate or adjacent the extendible tray sides 36A, 36B would be directed toward the extendible tray side 36A, 36B with little interior space 33 therebetween. Without sufficient interior space 33 between a fiber optic adapter 22 and the extendible tray sides 36A, 36B, there may not be sufficient room for a fiber optic connector to be inserted into the fiber optic adapter 22, or the interior space 33 may severely and undesirably bend an optical fiber coupled to the fiber optic adapter 22.

In the illustrated embodiment, the third and fourth flared panel surfaces 42A, 42B are each arranged along longitudinal axes orthogonally or substantially orthogonally towards the extendible tray sides 36A, 36B and parallel or substantially parallel to the plane of the front door 34. Thus, any fiber optic connectors coupled into fiber optic adapters 22 supported by the third and fourth flared panel surfaces 42A, 42B will be directed in a plane perpendicular to the front door 34 with interior space 33 therebetween and not in a direction towards the extendible tray sides 36A, 36B. However, the third and fourth flared panel surfaces 42A, 42B do not have to be arranged perpendicular or substantially perpendicular towards the extendible tray sides 36A, 36B. The third and fourth flared panel surfaces 42A, 42B can be angled with respect to the plane of the front door 34. Reducing the angle of angles $\Theta_1$ and $\Theta_2$ of the angled panel surfaces 40A, 40B by any amount or means may provide sufficient interior space 33 between fiber optic adapters 22 adjacent or proximate to the extendible tray sides 36A, 36B to allow room for fiber optic connectors coupled to such fiber optic adapters 22 and/or to avoid bending or tight undesired bending in optical fiber coupled to such fiber optic connectors. It should also be noted that only one of the third or fourth panel surfaces 42A, 42B may be included in an adapter module panel.

The adapter module panel 24 of the fiber optic adapter module 14 illustrated in FIG. 1 also contains an optional fifth panel surface 44 located and connected between the angled panel surfaces 40A, 40B. The fifth panel surface 44 is aligned along a longitudinal axis 46 that intersects with the longitudinal axes 41A, 41B of the angled panel surfaces 40A, 40B. The fifth panel surface 44 may be included in particular if it is desired to support one more fiber optic adapters 22 at or proximate to where the longitudinal axes 41A, 41B of the two angled surfaces 40A, 40B intersect each other. Similar to the third and fourth flared panel surfaces 42A, 42B, the fifth panel surface 44 may be configured to be aligned along a longitudinal axis 46 that intersects with the longitudinal axes 41A, 41B of the angled panel surfaces 40A, 40B. This allows a sufficient surface area for one or more fiber optic connections to be made to one or more fiber optic adapters 22 located proximate or adjacent to where the longitudinal axes 41A, 41B of the two angled surfaces 40A, 40B intersect each other while avoiding or reducing tight bending in fiber optic cables coupled to such fiber optic adapter 22. In this illustrated example of FIG. 1, the length of the fifth panel surface 44 is approximately 1.25 inches and supports one fiber optic adapter 22. However, the length of the fifth panel surface 44 can be extended to support more than one fiber optic adapter 22, such as will be described later in this application with respect to FIG. 14.

Also in the illustrated embodiment of FIG. 1, and similar to the third and fourth flared panel surfaces 42A, 42B, the fifth panel surface 44 is arranged such that its longitudinal axis 46 is aligned orthogonally or substantially orthogonally towards the extendible tray sides 36A, 36B and parallel or substantially parallel to the plane of the front door 34. Thus, any fiber optic connectors inserted into fiber optic adapters 22 supported by the fifth panel surface 44 will be directed in a plane perpendicular to the front door 34 and not in a direction towards the extendible tray sides 36A, 36B. However, the fifth panel surface 44 does not have to be arranged perpendicularly or substantially perpendicularly towards the extendible tray sides 36A, 36B. The fifth panel surface 44 could also be angled with respect to the plane of the front door 34.

Figure 4:
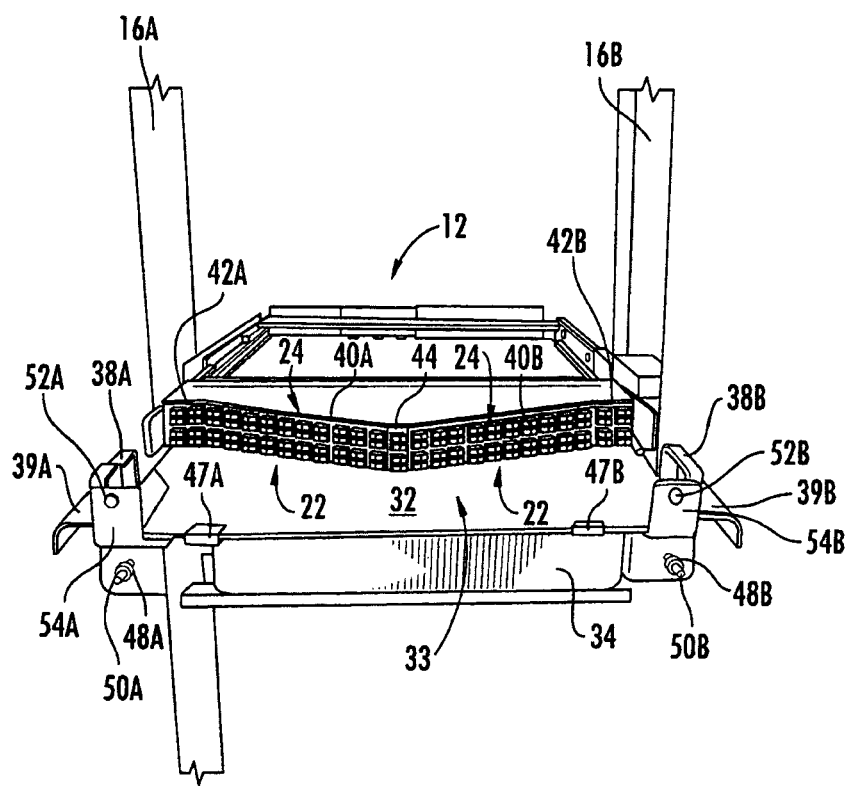
FIG. 4 is a front perspective view of the fiber optic equipment tray of FIG. 1, with a front door of the extendible tray lowered.

FIG. 4 illustrates the equipment rack 10 and fiber optic adapter module 14 of FIG. 1, with the front door 34 of the extendible fiber optic tray 20 lowered. As illustrated, the front door 34 is lowered to expose the interior space 33 in the extendible fiber optic tray 20. The front door may be constructed out of any material, including but not limited to LEXAN®, which is a flexible and transparent material. The front door 34 is fixedly attached to the extendible tray 20 via hinges 47A, 47B attached to the inside of the front door 34 and the floor 32 of the extendible tray 20. The front door 34 can be lowered, but remains attached via the hinges 47A, 47B to the extendible tray 20 when opened. The front door 34 also contains two rotatable cam latches 35A, 35B (illustrated in FIG. 1) on ends of the front door 34 that are configured to apply and release pressure on grommets 48A, 48B held by cam shafts 50A, 50B and attached to the cam latches 35A, 35B. The grommets 48B, 48B are made from a material that is expandable and elastic, such as rubber for example. When the cam latches 35A, 35B are engaged (i.e., flipped downward or toward the front door 36), pressure is applied to squeeze the grommets 48A, 48B toward the cam latches 35A, 35B such that the grommets 48A, 48B expand in outer diameter. The outer diameter of the grommets 48A, 48B in expanded form is larger than the inner diameter of receptacles or orifices in the form of cam orifices 52A, 52B supported by tabs 54A, 54B extending upward and attached to the extendible tray 20. Thus, when the cam shafts 50A, 50B and grommets 48A, 48B are located inside the cam orifices 52A, 52B and in expanded form, the grommets 48A, 48B prevent the cam shafts 50A, 50B from being released from the cam orifices 52A, 52B, thus keeping the front door 34 latched or closed. To open the front door 34, the cam latches 35A, 35B are released (i.e., flipped upward or away from the front door 34) to release pressure applied to the grommets 48A, 48B such that the outer diameter of the grommets 48A, 48B is less than the inner diameter of the cam orifices 52A, 52B. The cam shafts 50A, 50B will then be allowed to pass through the cam orifices 52A, 52B thereby opening the front door 34.

Figure 5:
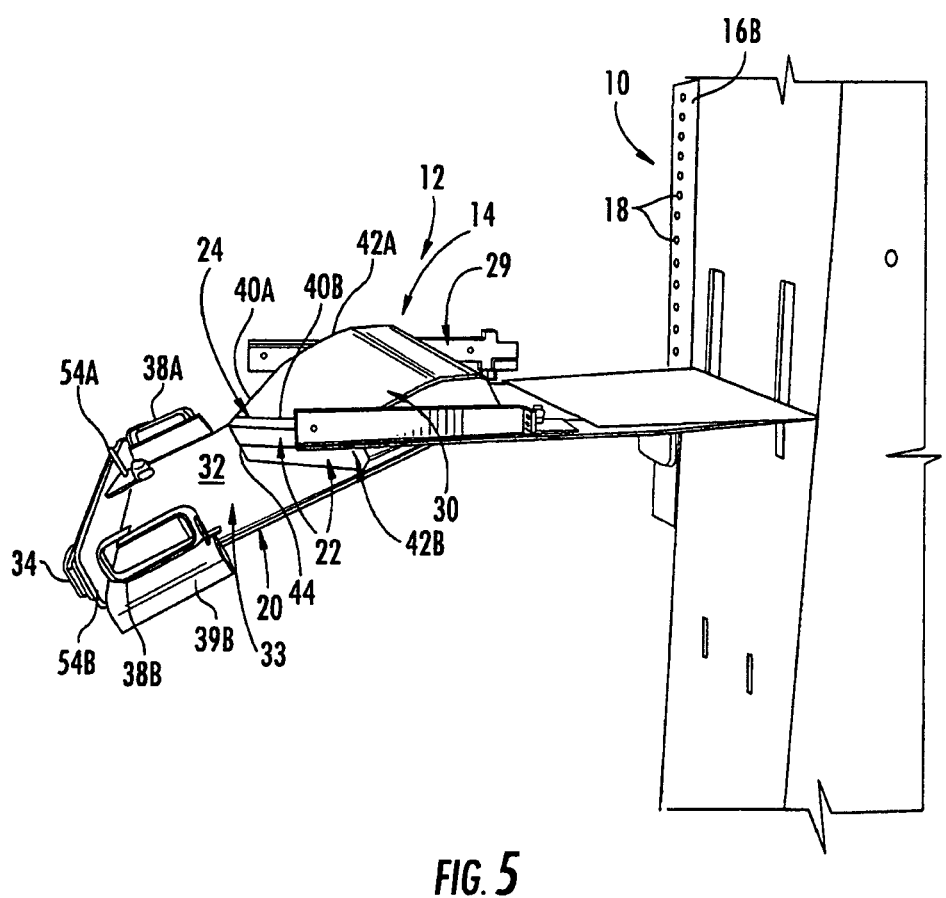
FIG. 5 is a side perspective view of the fiber optic equipment tray of FIG. 1 extended forward from an equipment rack and tilted downward for access.
Figure 6:
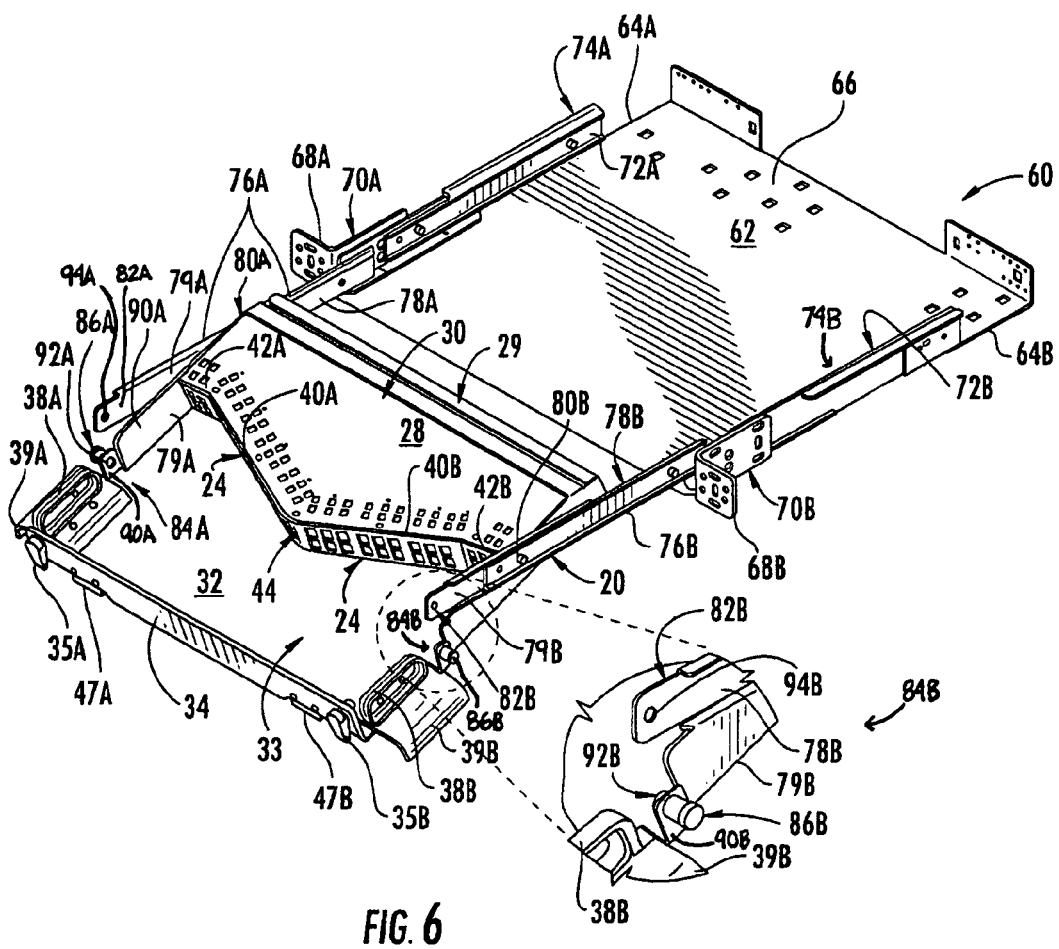
FIG. 6 is a perspective view of the fiber optic equipment tray and fiber optic adapter module of FIG. 1 illustrating various components of the fiber optic equipment tray and the fiber optic adapter module.

FIG. 5 illustrates a side perspective view of the fiber optic equipment tray 12 of FIG. 1, with the extendible tray 20 extended forward from the equipment rack 10 and tilted downward for enhanced access. FIG. 6 illustrates a schematic diagram of the side perspective view of the fiber optic equipment tray 12 in FIG. 5. Both will be referenced to discuss the selectively extendible and titling aspects, features, and related components of the fiber optic equipment tray 12 in accordance with embodiments of the invention.

The fiber optic equipment tray 12 is comprised of a fixed or non-extendible portion or tray 60 configured to selectively retain the extendible tray 20 holding the fiber optic adapter module 14. The fixed tray 60 provides an interior space 62 formed by sides 64A, 64B disposed about a bottom or floor 66. The interior space 62 is configured to retain the extendible tray 20 when not in an extended position. The fixed tray 60 is configured to be retained inside the equipment rack 10 via fastener tabs 68A, 68B coupled to the fixed tray 60, via coupling members 70A, 70B. The fastener tabs 68A, 68B are adapted to abut against and fasten to the front of the vertical rails 16A, 16B when the fiber optic equipment tray 12 is installed into the equipment rack 10.

Fixed receivers 72A, 72B are disposed on each side 64A, 64B of the fixed tray 60 to provide for the ability of the extendible tray 20 to be extended from the interior space 62. The fixed receivers 72A, 72B are coupled to the fixed tray 60 via receiver coupling members 74A, 74B disposed on each side 64A, 64B of the fixed tray 60. The fixed receivers 72A, 72B are configured to receive and support a first set of slidable rails 76A, 76B. Ball bearings are included between the fixed receivers 72A, 72B and the first set of slidable rails 76A, 76B to allow the first set of slidable rails 76A, 76B to move transversely with respect to the fixed receivers 72A, 72B. A second set of slidable rails 78A, 78B are coupled to fixed rails 79A, 79B, which are coupled to the sides of the extendible tray 20. The second set of slidable rails 78A, 78B are configured to be received and supported by the first set of slidable rails 76A, 76B. The second set of slidable rails 78A, 78B, and thus the extendible tray 20 due to their coupling via the fixed rails 79A, 79B to the second set of slidable rails 78A, 78B, can move transversely with respect to the first set of slidable rails 76A, 76B. Providing a second set of slidable rails 78A, 78B allows the extendible tray 20 to be extend farther out from the fixed tray 60 than would otherwise be possible with only a single set of slidable rails. The second set of slidable rails 78A, 78B also allows the extendible tray 20 to be extended outward from the fixed tray 60 a sufficient and desired length to allow the extendible tray 20 to be tilted downward, the features and components of which will now be discussed.

Figure 7:
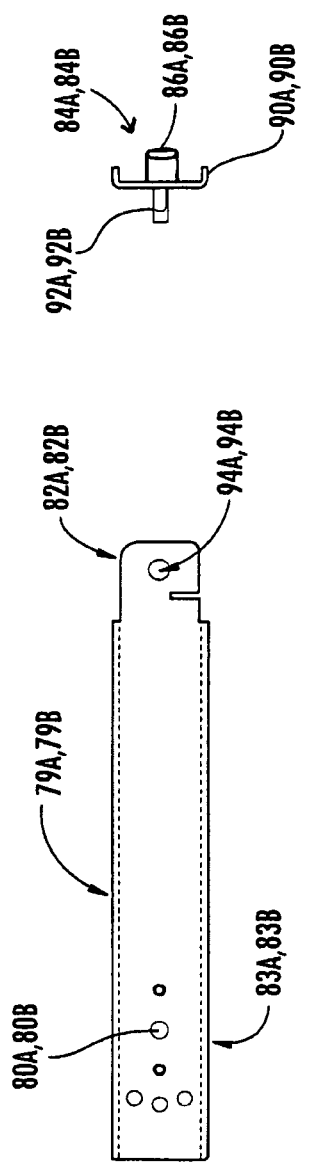
FIG. 7 illustrates a pivot support and corresponding extendible tray tilting mechanism of the fiber optic equipment tray of FIG. 1.
Figure 8A:
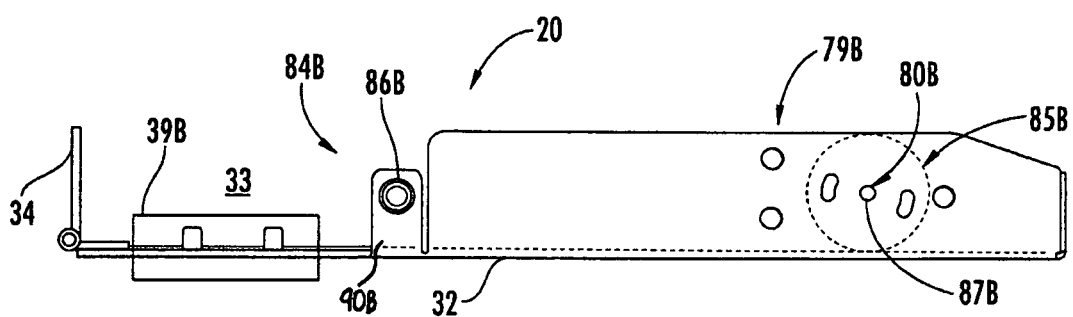
FIG. 8A illustrates a side view of the housing base of the fiber optic equipment tray of FIG. 1.
Figure 8B:
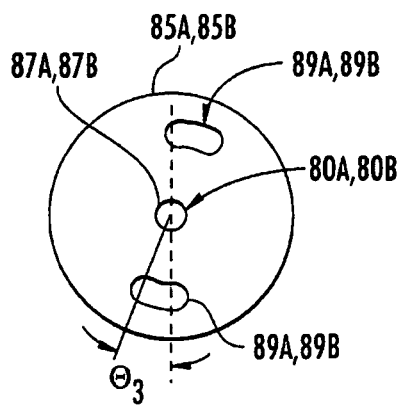
FIG. 8B illustrates the pivot system of the fiber optic equipment tray of FIG. 1.

As illustrated in FIG. 6, the second set of slidable rails 78A, 78B are coupled to the fixed rails 79A, 79B of the extendible tray 20 at two points: pivot points 80A, 80B, and latching points 82A, 82B located a length away from the pivot points 80A, 80B toward the front of the extendible tray 20. In the disclosed embodiment, the pivot points 80A, 80B are each located approximately 5⅞ inches from the latching points 82A, 82B (see also, FIG. 7). Pivot systems 83A, 83B are provided at the pivot points 80A, 80B between the fixed rails 79A, 79B and the second set of slidable rails 78A, 78B, as illustrated in FIGS. 8A and 8B. The pivot systems 83A, 83B allow the fixed rails 79A, 79B, and thus the extendible tray 20, to pivot and tilt at an angle downward with respect the second set of slidable rails 78A, 78B, which are located in the same horizontal plane of first slidable rails 76A, 76B and the fixed receivers 72A, 72B, and thus also at the same angle downward with respect to the fixed tray 60. As also illustrated in FIGS. 8A and 8B, the pivot systems 83A, 83B include pivot pems 85A, 85B coupled between and to the first set of slidable rails 78A, 78B, which contain center orifices 87A, 87B to retain the pivot points 80A, 80B. Circular slot orifices 89A, 89B are also provided in the pivot pems 85A, 85B that control the maximum angle of tiling of the extendible tray 20 in the Y-axis based on the radian length of the circular slot orifices 89A, 89B. In this disclosed embodiment, the maximum tilt angle $\Theta_3$ is approximately twenty three (23) degrees, but any other angles may be provided, including between one (1) to ninety (90) degrees, subject to preserving the structural integrity of the circular slot orifices 89A, 89B or other titling mechanism employed.

Figure 9:
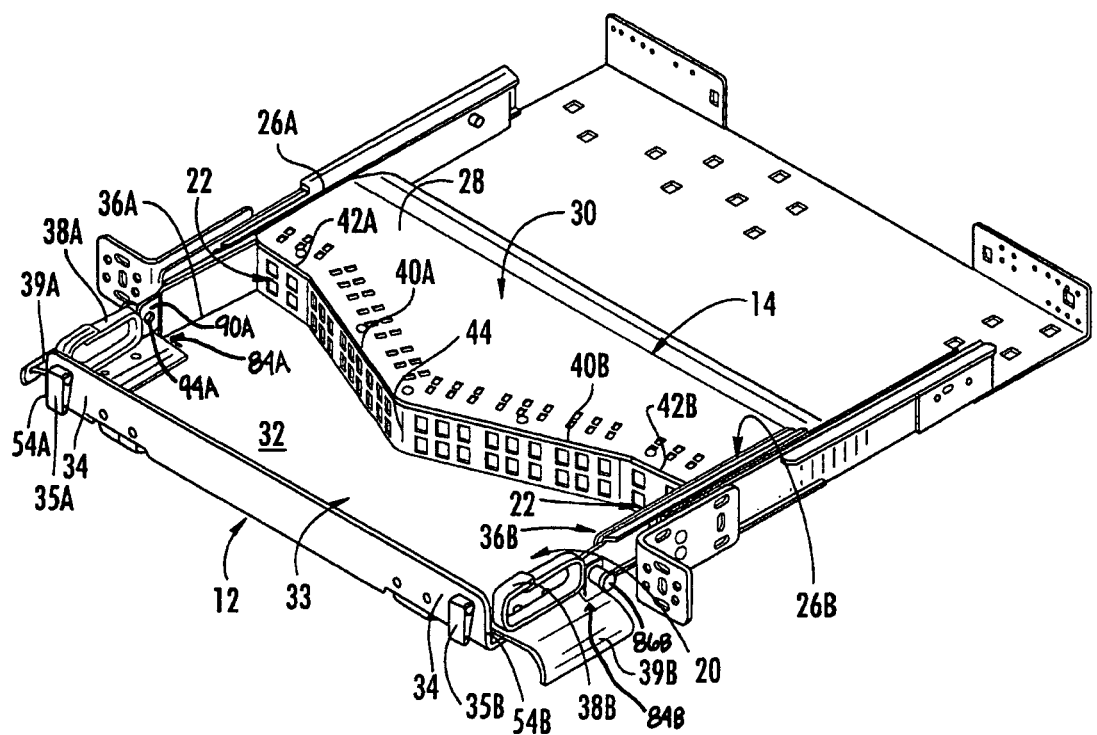
FIG. 9 is an enlarged perspective view of the fiber optic equipment tray of FIG. 1 with the extendible tray carrying the fiber optic adapter module position.
Figure 10:
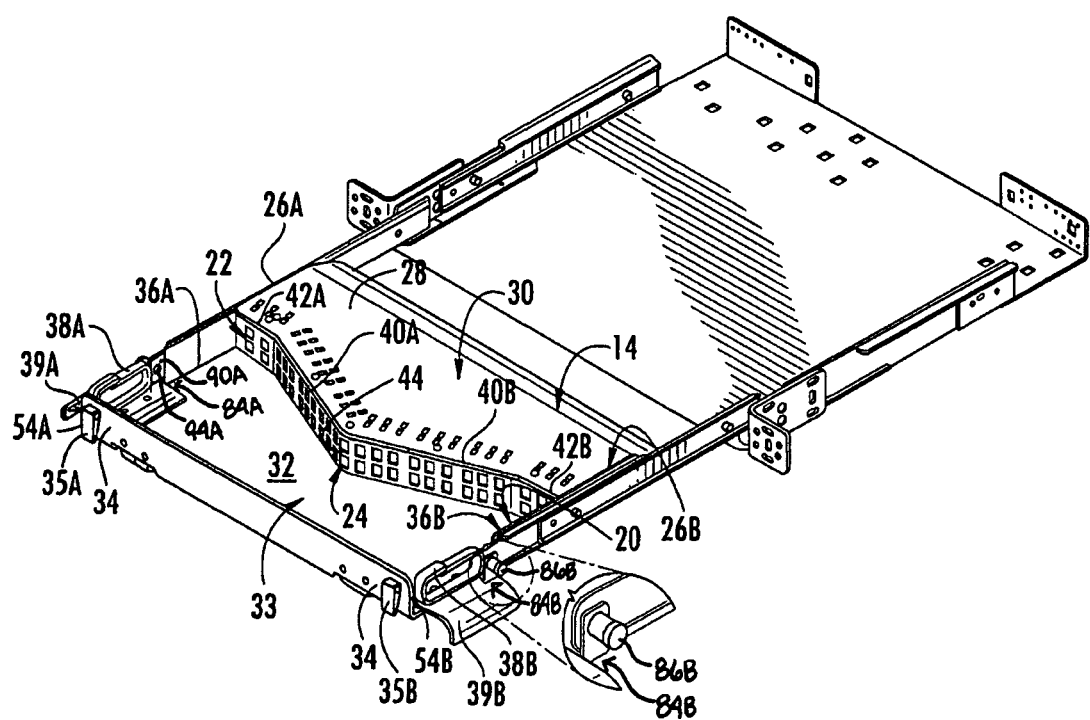
FIG. 10 is an enlarged perspective view of the fiber optic equipment tray of FIG. 1 with the extendible tray carrying the fiber optic adapter module in a withdrawn, extended position and tilting mechanism locked.
Figure 11:
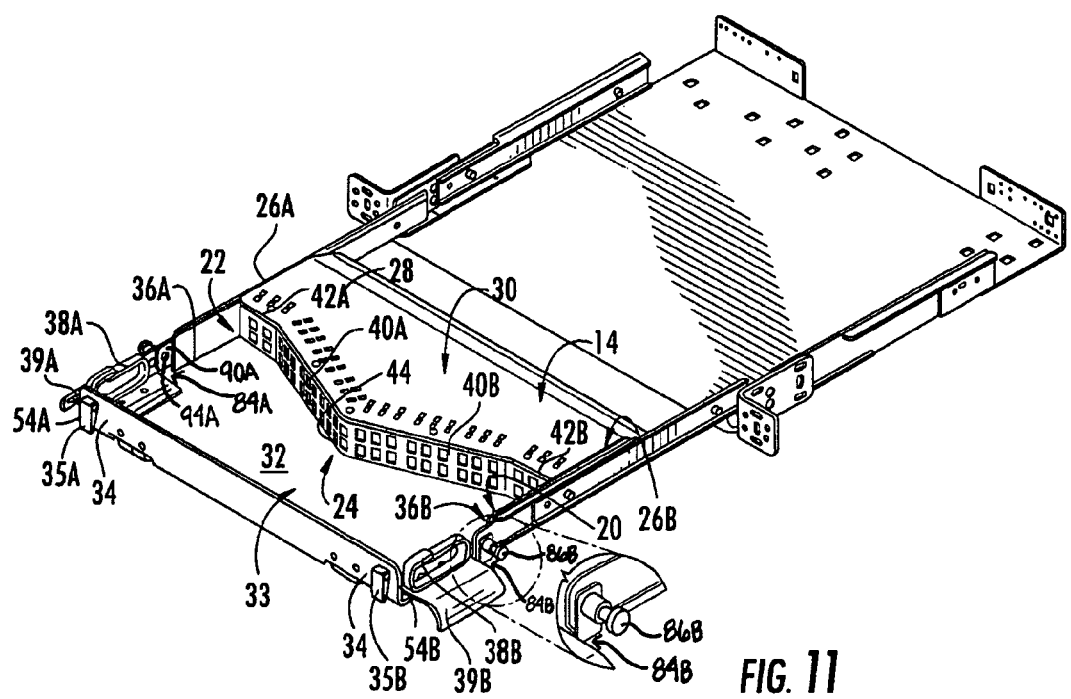
FIG. 11 is an enlarged perspective view of the fiber optic equipment tray of FIG. 1 with the extendible tray carrying the fiber optic adapter module in a withdrawn, extended position and tilt mechanism opened.

Locking mechanisms in the form of latching mechanisms 84A, 84B are provided to lock the latching points 82A, 82B to the second set of slidable rails 78A, 78B. When locked, the extendible tray 20 does not tilt. Plunger mechanisms 86A, 86B are attached on sides of the extendible tray 20, via tabs 90A, 90B extending upward on sides of the extendible tray 20, such that spring-loaded plungers 92A, 92B are aligned to engage and insert into latching orifices 94A, 94B. Before the extendible tray 20 is extended outward from the fixed tray 60, the plungers 92A, 92B are inserted into the latching orifices 94A, 94B, as illustrated in FIG. 9. When the plungers 92A, 92B are inserted into the latching orifices 94A, 94B, the extendible tray 20 is aligned with the fixed tray 60. The extendible tray 20 cannot be fully extended into the fixed tray 60 until the extendible tray 20 is aligned along the same plane as the fixed tray, (i.e. not tilted). After the extendible tray 20 is extended outward from the fixed tray 60, as illustrated in FIG. 10, the plungers 92A, 92B can be selectively released from the latching orifices 94B, 94B, as illustrated in FIG. 11. The extendible tray 20 can rotate about the pivot points 80A, 80B as illustrated in FIG. 8A. As illustrated in FIGS. 8A and 8B, the fixed rails 79A, 79B are affixed to the circular slot orifices 89A, 89B of the pivot pems 85A, 85B such that the amount of tilting is controlled as previously discussed. However, even if the pivot pems 85A, 85B were not provided with only pivot points 80A, 80B being provided, the extendible tray 20 would be permitted to tilt downward or upward until it reached and contacted the equipment rack 10.

Figure 12:
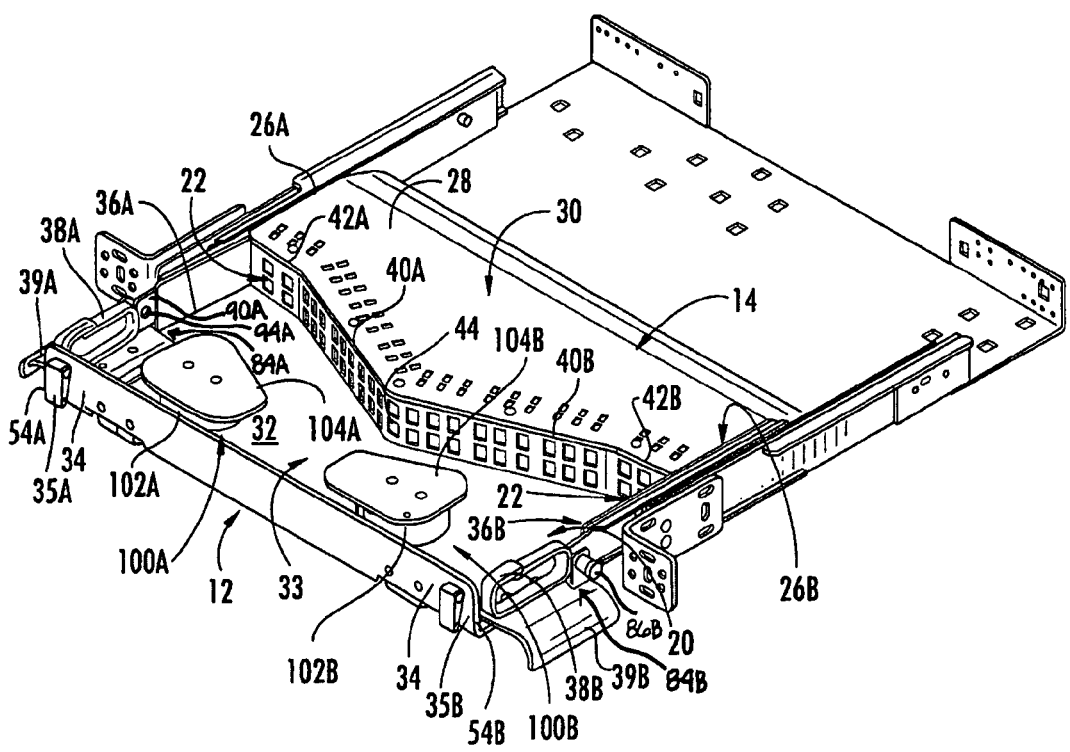
FIG. 12 is an enlarged perspective view of the fiber optic equipment tray of FIG. 1 with fiber spool guides included in the extendible tray in an alternative embodiment.

FIG. 12 illustrates the fiber optic equipment tray 12 of the preceding figures, but with optional fiber spool guides 100A, 100B provided in the extendible tray 20. One or more fiber spool guides 100A, 100B may be provided. Fiber spool guides 100A, 100B provide posts that support a more gradual bending of optical fibers within fiber optic cables connected to fiber optic adapters 22. The fiber spool guides 100A, 100B may be particularly useful for preventing or reducing tight bending in optical fibers connected to fiber optic adapters 22 located near or adjacent the sides 36A, 36B of the fiber optic equipment tray 12, since these fiber optic adapters 22 are arranged at acute angles with respect to the cable retention members 38A, 38B. The fiber spool guides 100A, 100B may also provide a convenient method of spooling slack fiber optic cable in the interior space 33 to provide neat routing of fiber optic connections. The fiber spool guides 100A, 100B include posts 102A, 102B that are coupled to the floor 32 of the extendible tray 20. The diameter of the posts 102A, 102B control the acuteness of the bending when optical fibers are routed around the posts 102A, 102B. Covers 104A, 104B may be placed overtop the posts 102A, 102B to prevent optical fibers around the posts 102A, 102B from extending above and slipping off of the posts 102A, 102B.

Figure 13:
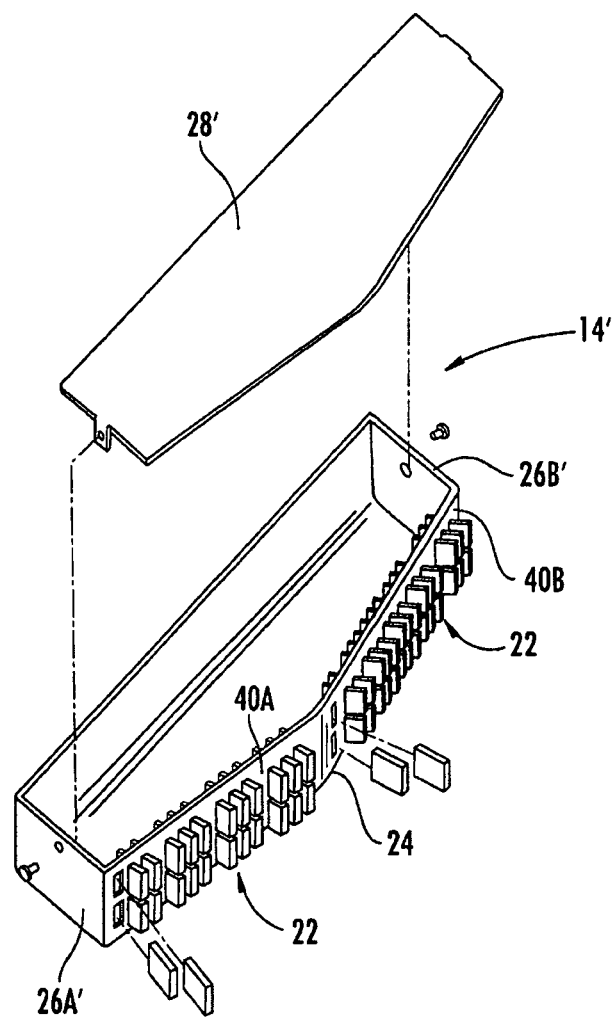
FIG. 13 illustrates an alternative embodiment of a fiber optic adapter module.

FIG. 13 illustrates an alternate embodiment of a fiber optic adapter module that may be used with the fiber optic equipment tray 10. A fiber optic adapter module 14' is illustrated that does not include flared panel surfaces in the adapter module panel like that provide in the adapter module panel 24 of FIG. 1. Only the two angled panel surfaces 40A, 40B are included. Depending on the angle of the angled panel surfaces 40A, 40B, providing fiber optic adapters 22 near or adjacent to the extendible tray sides 36A, 36B may allow for fiber optic connections without bending of optical fibers that could cause damage or severance of the optical fibers.

Figure 14:
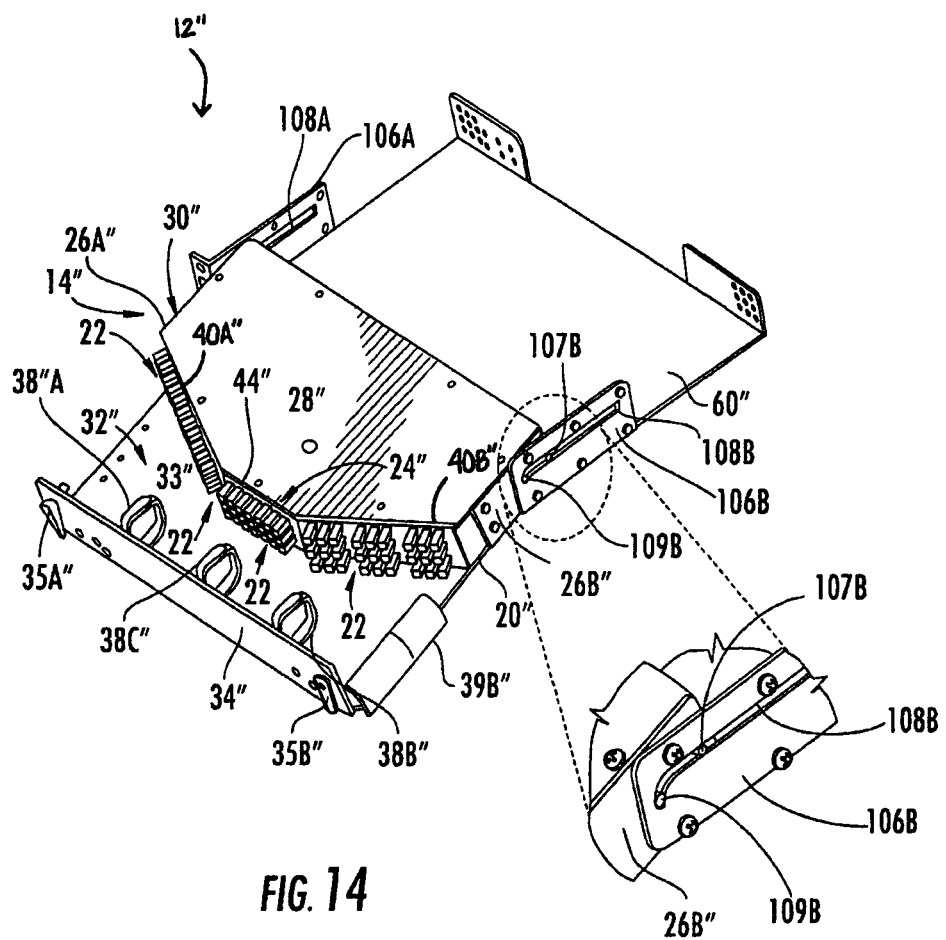
FIG. 14 illustrates another alternative embodiment of a fiber optic equipment tray and fiber optic adapter module carried therein.

FIG. 14 illustrates another alternate embodiment of a fiber optic adapter module 14" and fiber optic equipment tray 12" that includes an angled multi-surface panel adapter module panel 24". The adapter module panel 24" is similar to the adapter module panel 24' of FIG. 13 in that flared surfaces are not included. However, it is similar to the adapter module panel 24 of FIG. 1 in that a center panel surface 44" is provided between the two angled panel surfaces 40A, 40B to support a plurality of fiber optic adapters 22 between the two angled panel surfaces 40A, 40B. The adapter panel surface 24" in FIG. 14 includes an increased surface area over a single and non-angled panel surface. The fiber optic equipment tray 12" also has an extendible tray 20" that tilts with respect to a fixed tray 60", but employing an alternate tilting mechanism. A different type of rail system is employed. A rail system is provided, but rails 106A, 106B do not move. They are fixedly attached to the fixed tray 60". The extendible tray 20" is detached from the fixed tray 60" and allowed to move about the fixed tray 60", except pins 107A, 107B extending from sides 26A", 26B" of the extendible tray 20" are engaged with slots 108A, 108B within the rails 106A, 106B. The pins 107A, 107B, and thus the extendible tray 20", can move about the slots 108A, 108B traversely. The extendible tray 20" is allowed to tilt when fully extended away from the fixed tray 60" by curved portions 109A, 109B disposed in the slots 108A, 108B, which allow the extendible tray 20" to rotate downward about the pins 107A, 107B at the curved portions 109A, 109B.

Figure 15:
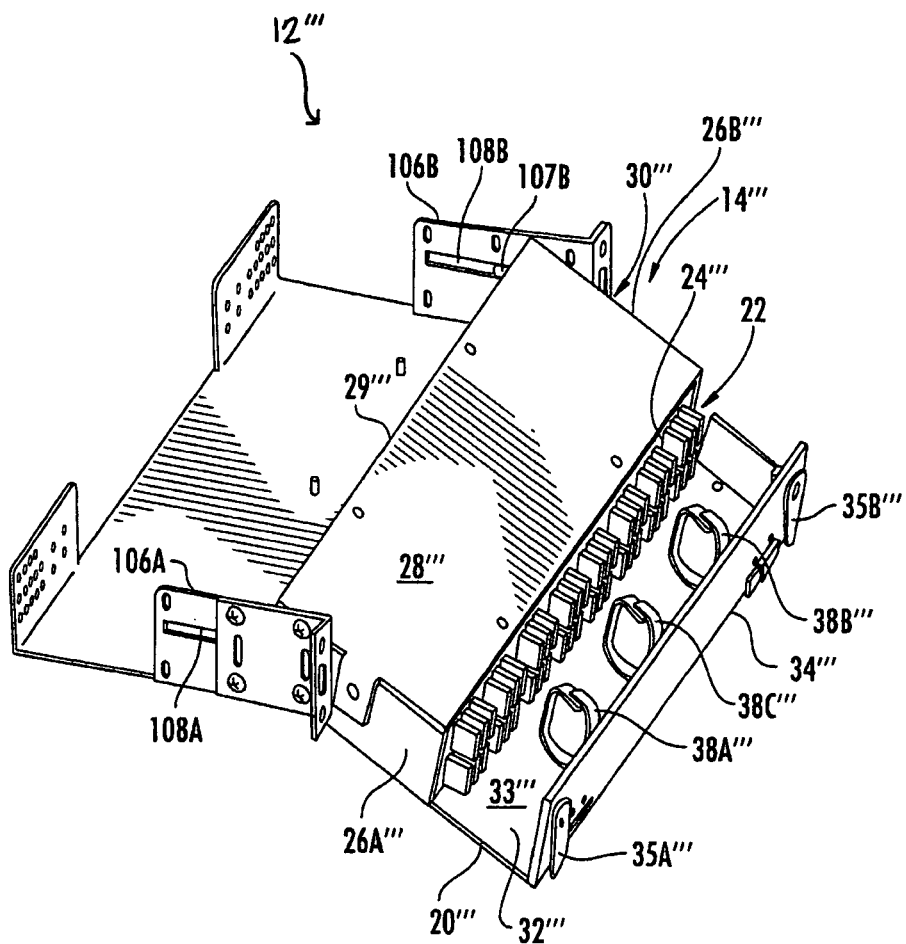
FIG. 15 illustrates another alternative embodiment of fiber optic equipment tray and fiber optic adapter module carried therein.

FIG. 15 illustrates yet another alternate embodiment of a fiber optic equipment tray 12''' and fiber optic adapter module 14'''. The fiber optic equipment tray 12''' is similar to the fiber optic equipment tray 12" of FIG. 14 and contains essentially the same tilt mechanism. The adapter module panel 24''' is not angled. It includes a straight panel surface perpendicular to fiber optic adapter module sides 26A''', 26B'''.

Figure 16:
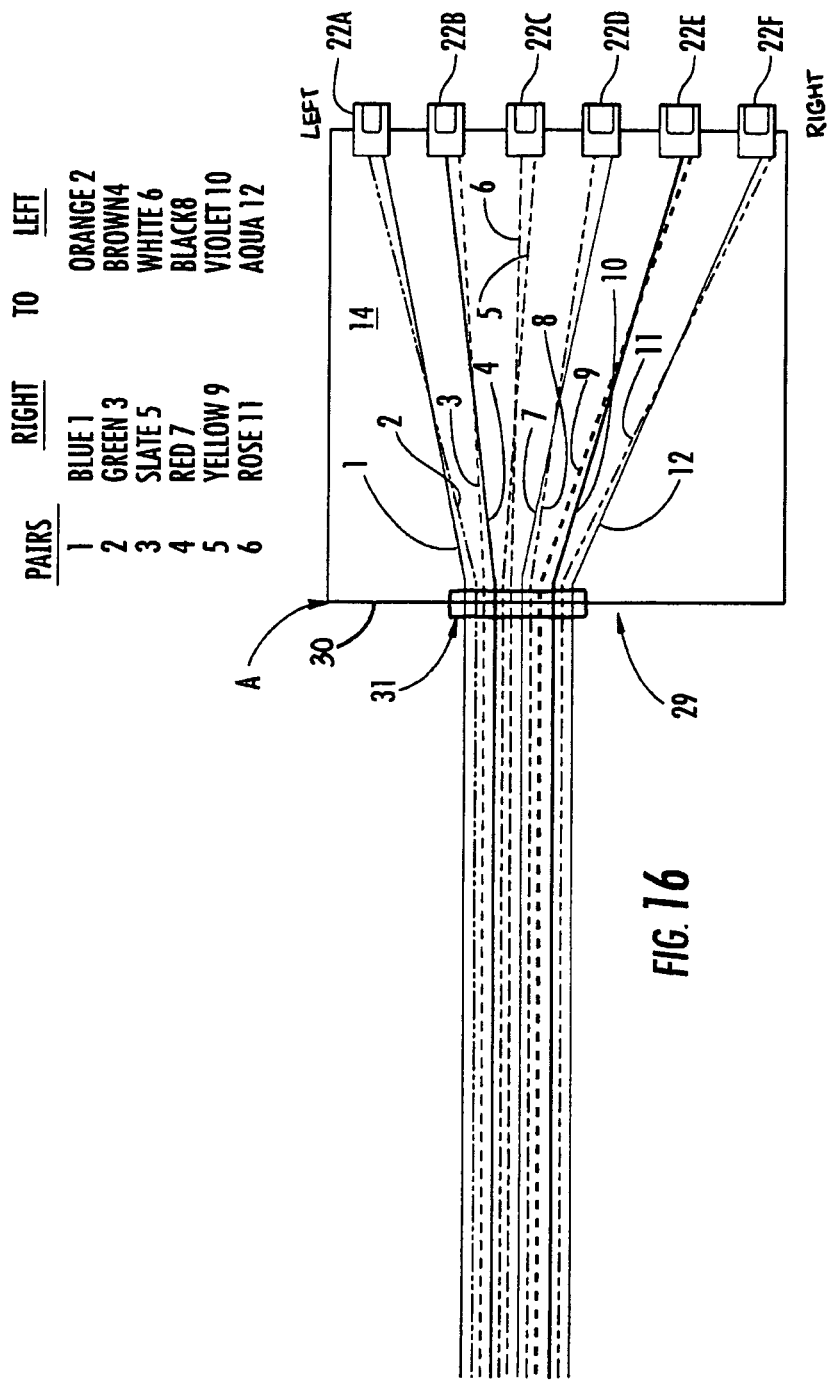
FIG. 16 is a schematic diagram of a pair-wise fiber flip routing scheme for a fiber optic adapter module.

Any type of optical fiber wiring scheme may be employed within the fiber optic adapter module 14. For example, FIG. 16 illustrates a conventional networking solution employing a pair-wise fiber flip routing scheme that may be employed in the fiber optic adapter module 14, or a disclosed variation. In the example, six fiber pairs are matched as follows: 1-2; 3-4; 5-6; 7-8; 9-10; and 11-12 are optically routed between six duplex fiber optic adapters 22 and a MTP connector adapter 31. Conventional networking solutions, which utilize a 12-fiber MTP connector assembly, for example, are configured in a point-to-point system. All of the optical fiber pairs are defined by optical fibers that are immediately adjacent to at least one other in an optical fiber ribbon provided inside the adapter module housing 30: 1 is immediately adjacent to 2, 3 next to 4, and so on. The fiber optic module adapter 14 illustrated in FIG. 16 (also labeled module 'A') is used in a system utilizing an "A" and "B" type module approach, where the fibers in a "B" module are flipped with respect to module A to address, or correct for, fiber polarity. Fiber polarity, i.e., based on a given fiber's transmit to receive function in the system, is addressed by flipping fibers in one end of the assembly just before entering the MTP connector adapter 31, or by providing "A" and "B" type break-out modules where the fiber is flipped in the "B" module and straight in the "A" module. Conventionally, MTP connectors are mated key up to key down.

In an effort to reduce implementation confusion, complexity and stocking issues with the "A" and "B" module method, or fiber flipping before entering the connector, a universal wiring scheme has been devised. This scheme is disclosed in U.S. Pat. No. 6,758,600 entitled "OPTICAL POLARITY MODULES AND SYSTEMS," assigned to the same assignee as the present application. Wiring a module, such as the fiber optic adapter module 14, in accordance with this universal wiring scheme eliminates the need for an 'A' and 'B' module approach. The module can be used universally in a networking system.

Figure 17:
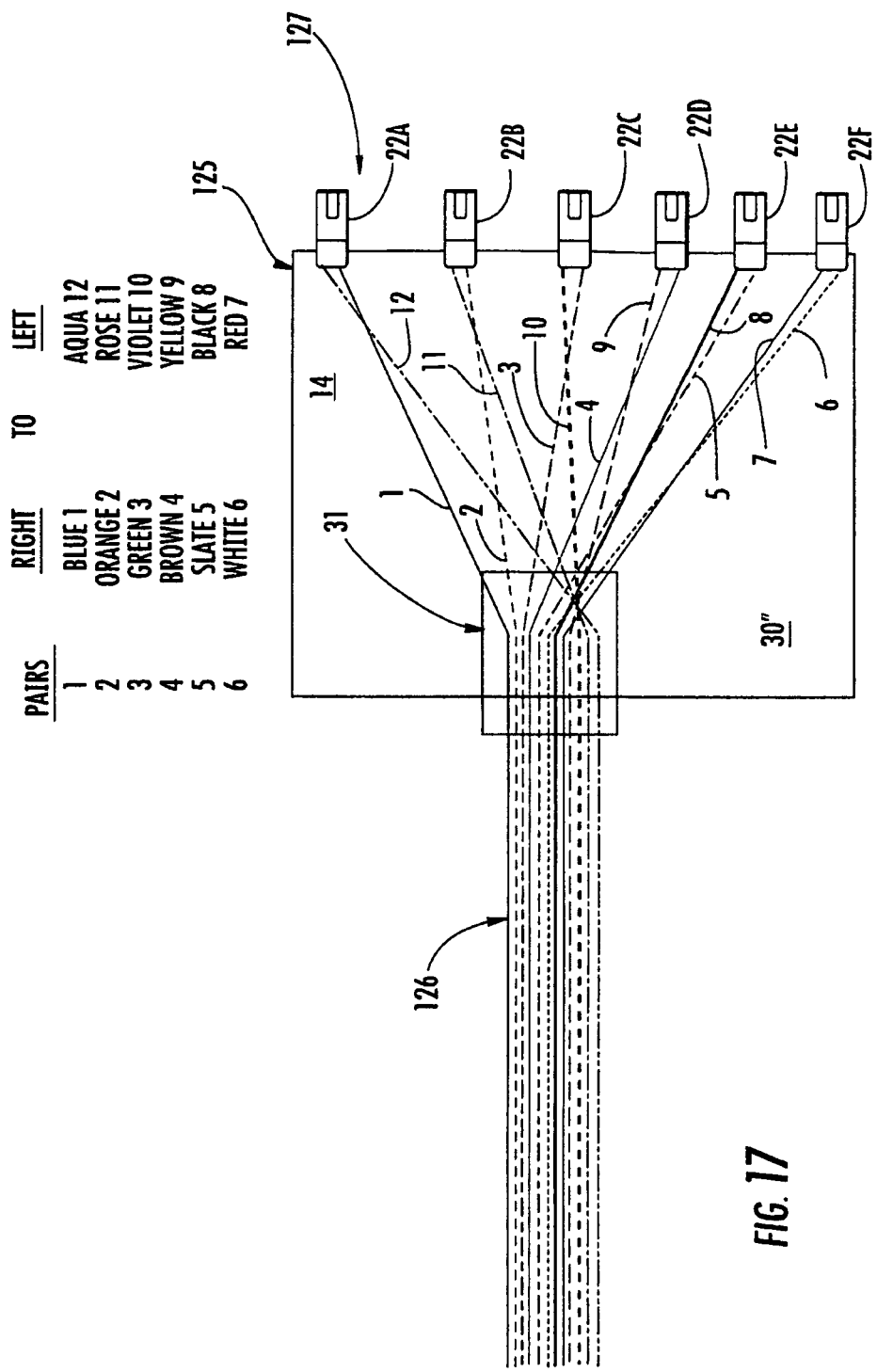
FIG. 17 is a schematic diagram of an exemplary universal optical fiber routing scheme for a fiber optic adapter module.

FIG. 17 illustrates the universal optical networking module, which may be included in the fiber optic adapter module 14, or a variation of such, for use with an optical fiber ribbon, for example having twelve optical fibers, connected to an MTP connector adapter 31 or MPO connector adapter. Using this networking module arrangement, multiple spans of assemblies can be interconnected. Fiber flips in the trunk assembly just prior to one end of a multi-fiber connector, such as a MTP connector, for polarity correction, is not necessary resulting in a complexity and/or cost reduction. Finally, a universal wired harness in the fiber optic adapter module 14 eliminates the need for two different types of breakout modules in the network.

Figure 18:
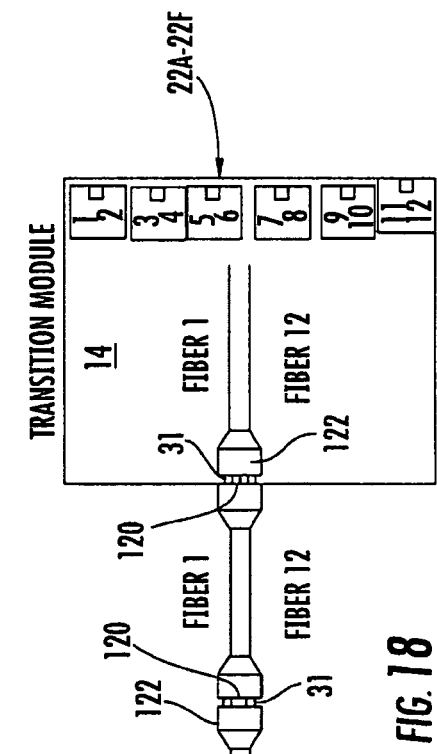
FIG. 18 is a schematic diagram of a first optical assembly employing the universal optical fiber routing scheme in FIG. 17.
Figure 18:
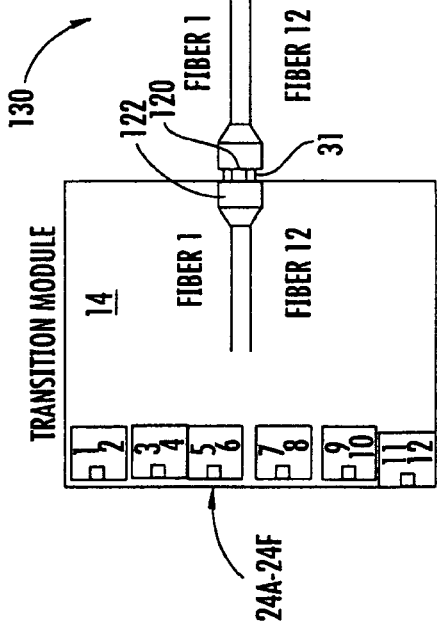
Figure 19:
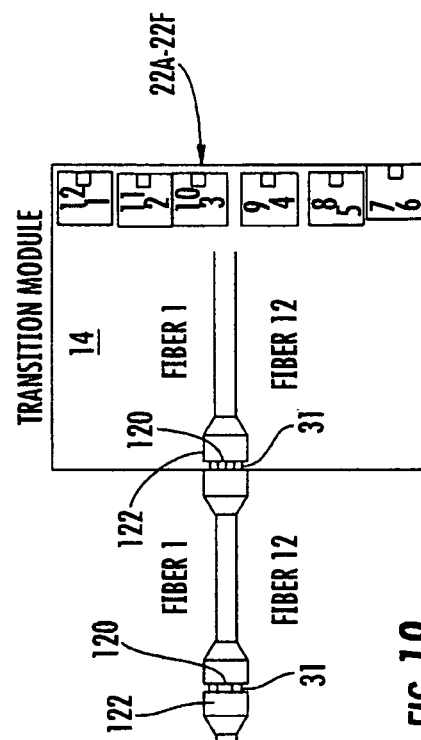
FIG. 19 is a schematic diagram of a second optical assembly employing the universal optical fiber routing scheme in FIG. 17.
Figure 19:
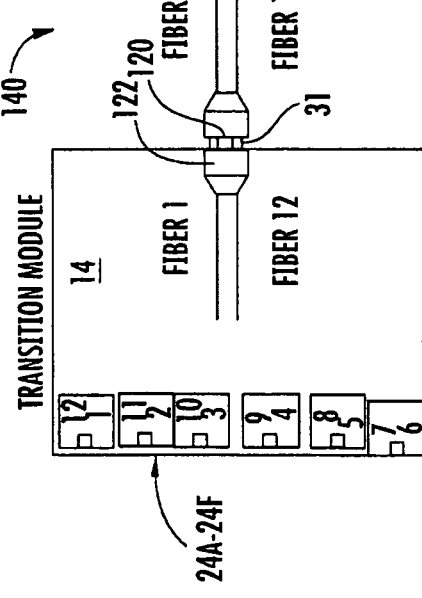

As illustrated in FIG. 17, an MTP connector adapter 31 can be disposed between the connector 120 outside the fiber optic adapter module 14 and a connector adapter 31 inside the fiber optic adapter module 14 (FIGS. 18-19). As illustrated in FIG. 17 illustrates an exemplary fiber wiring scheme for routing of optical fibers of the optical fiber ribbon 126 from connector 120 to single or multi-fiber connectors located at connector stations 22A-22F, defined at a break-out section 125 in the fiber optic adapter module 14. Each connector station 127 preferably includes one or more connector adapters 22A-22F. In the fiber optic adapter module 14, an exemplary routing scheme is the following by folding the optical fiber ribbon 126: optical fiber number 1 (blue) is paired with optical fiber number 12 (aqua); optical fiber number 2 (orange) is paired with optical fiber number 11 (rose); optical fiber number 3 (green) is paired with optical fiber number 10 (violet); through the remaining numbers/colors of fiber with the last pair being optical fiber number 6 (white) with optical fiber number 7 (red).

With reference to FIG. 17, the optical fiber pairs are defined as follows: 1-12; 2-11; 3-10; 4-9; 5-8; and 6-7. At least one, but preferably at least eighty percent (80%) of the optical fiber pairs routed to respective connector stations 1-6 are made by optical fibers not immediately adjacent in the optical fiber ribbon 126. In other words, the optical paths of the connector adapter 31 and the fiber optic connector adapters 22A-22F at stations 125 are optically interconnected by optical fibers disposed in housing 30" of the module 14, the optical fiber pairs being formed by the optical fibers. At least one of the optical fiber pairs being in optical communication with respective optical paths in connector adapter 31 and being routed to a respective optical connector station 125, the at least two optical paths being selected from optical paths not being immediately adjacent to each other. Preferably, eighty percent (80%) of the optical fiber pairs can be optically interconnected with the optical paths are selected from optical paths not being immediately adjacent to each other.

FIGS. 18-19 illustrate exemplary systems 130, 140, respectively, employing fiber optic adapter modules 14. The system concept comprises MTP or MPO connectors 122 with associated MTP connector adapters 31, and optical fiber ribbons 126. For example, two MTP or MPO connectors 122 mate via the MTP or MPO adapter 31, with the key of each MTP or MPO in the same relative position (i.e., keys up or keys down). In the illustrated embodiments, all MTP or MPO connectors 122 and dual fiber connectors at stations 125 are mated with keys 120 in the same position, i.e., all keys 120 up or all keys 120 down. In systems 130, 140, the polarity is not reversed, fibers one through twelve are not flipped between the modules. In other words, the optical paths are not flipped at the fiber optic adapters 31 or other position between the fiber optic adapter modules 14. For example, the optical path remains with its color, blue stays with blue (1-1), orange with orange (2-2), green with green (3-3), and so on, from one module to another including the MPO connectors 122 externally of the fiber optic adapter modules 14.

To implement reverse-ribbon positioning in the cabling system the following steps should be taken: a) assign each fiber in a given ribbon a sequential number, as described above; b) as shown in FIG. 18, install the MPO connectors 122 as follows: (1) on one end of the cable, install an optical ribbon into the MPO connector 122 with the fibers in consecutive numbering (e.g., 1, 2, 3, 4 . . . 12) from left to right with the key up; (2) on the other end of the cable, install the ribbon into the MPO connector 122 with the fibers in reverse numbering (12, 11, 10, 9 . . . 1) from left to right with the key up.

Transitioning the ribbon cabling into multiple duplex systems completes reverse-pair positioning. This transition can be implemented with transition modules or transition assemblies (see FIGS. 18-19), having MTP or MPO to dual-fiber connectors 122 or duplexed single-fiber connectors. If transition assemblies are used, the positioning of the fibers inside the connectors is implemented the same as the implementation inside the respective modules.

Many modifications and other embodiments of the invention set forth herein will come to mind to one skilled in the art to which the invention pertains having the benefit of the teachings presented in the foregoing descriptions and the associated drawings. These modifications include, but are not limited to, alternative shapes for a fiber optic adapter module and its adapter module panel, use of flared surfaces to change angles of direction of fiber optic adapters supported by an adapter module panel, tilting and extension mechanisms for the extendible tray supporting the fiber optic adapter module; use of fiber spool guides; alternative shapes of the plunger to lock in the straight vertical position; different material used for the door; and the back panel can be redesigned as separated part.

Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A fiber optic adapter module, comprising:
   a housing including a cover spanning a first and second side walls, an adapter module panel supporting a first plurality of fiber optic adapters, and a rear panel separate from the adapter module panel,
   wherein the adapter module panel comprises:
      a first and second forward facing surfaces angled to one another; and
      a third flared surface angled relative to the first forward facing surface and extending between the first forward facing surface and the first side wall, and wherein the fiber optic adapter module is coupled to an extendible tray, and wherein interior space in the fiber optic adapter module extends to proximate extendible tray sides; and
   a second plurality of fiber optic adapters mounted in the rear panel, wherein one or more optical paths are provided inside the housing such that one or more of optical fibers coupled to one or more of the first plurality of fiber optic adapters route and couple to one or more of the second plurality of fiber optic adapters.

2. The fiber optic adapter module of claim 1, wherein the first and second forward facing surfaces are angled relative to the first and second side walls.

3. The fiber optic adapter module of claim 1, wherein the first forward facing surface is aligned along a first longitudinal axis, and the second forward facing surface is aligned along a second longitudinal axis intersecting with the first longitudinal axis.

4. The fiber optic adapter module of claim 3, wherein the first longitudinal axis intersects with the second longitudinal axis proximate a centerline of the housing parallel to the first and second side walls.

5. The fiber optic adapter module of claim 3, wherein the third flared surface is aligned along a third longitudinal axis intersecting with the first longitudinal axis.

6. The fiber optic adapter module of claim 5, wherein the adapter module panel further includes a fourth flared surface aligned along a fourth longitudinal axis intersecting with the second longitudinal axis and extending between the second forward facing surface and the second side wall.

7. The fiber optic adapter module of claim 6, wherein the adapter module panel further includes a fifth surface aligned along a fifth longitudinal axis intersecting with the first and second longitudinal axes and is connected between the first forward facing surface and the second forward facing surface.

8. The fiber optic adapter module of claim 1, wherein the first forward facing surface and the second forward facing surface each support at least one of the first plurality of fiber optic adapters.

9. The fiber optic adapter module of claim 6, wherein the third flared surface and the fourth flared surface each support at least one of the first plurality of fiber optic adapters.

10. The fiber optic adapter module of claim 7, wherein the fifth surface supports at least one of the first plurality of fiber optic adapters.

11. The fiber optic adapter module of claim 1, wherein the first plurality of fiber optic adapters are fiber optic adapters comprised from the group consisting of a single fiber optic adapter, duplex fiber optic adapters, and multi-fiber adapters.

12. The fiber optic adapter module of claim 1, wherein the one or more optical fibers form a plurality of fiber pairs, wherein at least one of the plurality of fiber pairs is interconnected with at least two of the one or more optical paths, the at least two of the one or more optical paths selected from optical paths not being immediately adjacent to each other.

13. The fiber optic adapter module of claim 12, wherein at least eighty percent (80%) of the plurality of fiber pairs are optically interconnected with the one or more optical paths selected from the optical paths not being immediately adjacent to each other.

14. A fiber optic adapter module, comprising:
a housing including a cover spanning a first and second side walls, an adapter module panel supporting a first plurality of fiber optic adapters, and a rear panel separate from the adapter module panel,
wherein the adapter module panel comprises:
 a first forward facing surface angled relative to the first and second side walls and aligned along a first longitudinal axis;
 a second forward facing surface angled relative to the first and second side walls and the first forward facing surface and aligned along a second longitudinal axis intersecting with the first longitudinal axis;
 a third flared surface angled relative to the first forward facing surface and extending between the first forward facing surface and the first side wall; and
 a fourth flared surface angled relative to the second forward facing surface and connected between the second forward facing surface and the second side wall;
wherein at least one of the first plurality of fiber optic adapters are supported by one or more of the first forward facing surface, the second forward facing surface, the third flared surface, and the fourth flared surface, and wherein the fiber optic adapter module is coupled to an extendible tray, and wherein interior space in the fiber optic adapter module extends to proximate extendible tray sides; and
a second plurality of fiber optic adapters mounted in the rear panel, wherein one or more optical paths are provided inside the housing such that one or more of optical fibers coupled to one or more of the first plurality of fiber optic adapters route and couple to one or more of the second plurality of fiber optic adapters.

15. The fiber optic adapter module of claim 14, wherein the third flared surface connects to the first side wall at an angle perpendicular or substantially perpendicular to the first side wall, and the fourth flared surface connects to the second side wall at an angle perpendicular or substantially perpendicular to the second side wall.

16. The fiber optic adapter module of claim 14, wherein the adapter module panel further comprises a fifth surface intersecting with a centerline of the housing parallel to the first and second side walls, wherein the fifth surface is connected between the first forward facing surface and the second forward facing surface.

17. The fiber optic adapter module of claim 14, wherein at least one of the first plurality of the fiber optic adapters are supported by each of the first and second forward facing surfaces.

\* \* \* \* \*